United States Patent
Tsin et al.

(10) Patent No.: US 8,428,319 B2
(45) Date of Patent: Apr. 23, 2013

(54) AUTOMATIC MEASUREMENT OF MORPHOMETRIC AND MOTION PARAMETERS OF THE CORONARY TREE FROM A ROTATIONAL X-RAY SEQUENCE

(75) Inventors: Yanghai Tsin, Plainsboro, NJ (US); Klaus J. Kirchberg, Plainsboro, NJ (US); Günter Lauritsch, Nürnberg (DE); Chenyang Xu, Berkeley, CA (US); Jan Boese, Eckental (DE); Rui Liao, Princeton Junction, NJ (US)

(73) Assignee: Siemens Aktiengesellschaft, München (DE)

( * ) Notice: Subject to any disclaimer, the term of this patent is extended or adjusted under 35 U.S.C. 154(b) by 472 days.

(21) Appl. No.: 12/764,225

(22) Filed: Apr. 21, 2010

(65) Prior Publication Data

US 2010/0272315 A1 Oct. 28, 2010

Related U.S. Application Data

(60) Provisional application No. 61/172,402, filed on Apr. 24, 2009.

(51) Int. Cl.
*G06K 9/00* (2006.01)
(52) U.S. Cl.
USPC ........... 382/128; 382/100; 382/130; 382/131; 382/181
(58) Field of Classification Search ........... 382/128–132
See application file for complete search history.

(56) References Cited

U.S. PATENT DOCUMENTS

| | | | |
|---|---|---|---|
| 7,689,019 B2* | 3/2010 | Boese et al. | 382/128 |
| 2004/0066958 A1* | 4/2004 | Chen et al. | 382/128 |
| 2006/0262970 A1* | 11/2006 | Boese et al. | 382/131 |
| 2008/0205722 A1* | 8/2008 | Schaefer et al. | 382/128 |
| 2009/0141968 A1* | 6/2009 | Sun et al. | 382/154 |
| 2010/0189337 A1* | 7/2010 | Jandt et al. | 382/132 |

OTHER PUBLICATIONS

T. Wischgoll, J.S. Choy, E.L. Ritman, and G.S. Kassab, "Validation of image-based method for extraction of coronary morphometry." Ann Biomed Eng, vol. 36, No. 3, pp. 356-368, Mar. 2008.

M.E. Martinez-Perez, A.D. Hughes, A.V. Stanton, S.A. Thom, N. Chapman, A.A. Bharath, and K.H. Parker, "Retinal vascular tree morphology: a semi-automatic quantification." IEEE Trans Biomed Eng, vol. 49, No. 8, pp. 912-917, Aug. 2002.

(Continued)

*Primary Examiner* — Jason M Repko
*Assistant Examiner* — Avinash J Yentrapati
(74) *Attorney, Agent, or Firm* — Donald B. Paschburg; F. Chau & Associates, LLC

(57) ABSTRACT

Automatic measurement of morphometric and motion parameters of a coronary target includes extracting reference frames from input data of a coronary target at different phases of a cardiac cycle, extracting a three-dimensional centerline model for each phase of the cardiac cycle based on the references frames and projection matrices of the coronary target, tracking a motion of the coronary target through the phases based on the three-dimensional centerline models, and determining a measurement of morphologic and motion parameters of the coronary target based on the motion.

16 Claims, 3 Drawing Sheets

OTHER PUBLICATIONS

I. Iakovou, L. Ge, and A. Colombo, "Contemporary stent treatment of coronary bifurcations." J Am Coll Cardiol, vol. 46, No. 8, pp. 1446-1455, Oct. 2005.

T. Konta and J.H.N. Bett, "Patterns of coronary artery movement and the development of coronary atherosclerosis." Circ J, vol. 67, No. 10, pp. 846-850, Oct. 2003.

A.J. O'Loughlin and K. Byth, "The strech-compression type of coronary artery movement predicts the location of culprit lesions responsible for st-segment elevation myocardial infarctions," Heart, Lung and Circulation, vol. 16, No. 4, pp. 265-268, 2007.

C. Blondel, G. Malandain, R. Vaillant, and N. Ayache, "Reconstruction of coronary arteries from a single rotational x-ray projection sequence," IEEE Transactions on Medical Imaging, vol. 25, No. 5, pp. 653-663, 2006.

R. Liao, Y. Sun, and L. Duong, "3-d symbolic reconstruction of coronary artery tree from multiple views of rotational x-ray angiography," in Second International Workshop on Computer Vision for Intravascular and Intracardiac Imaging (CVII), 2008.

* cited by examiner

AUTOMATIC MEASUREMENT OF MORPHOMETRIC AND MOTION PARAMETERS OF THE CORONARY TREE FROM A ROTATIONAL X-RAY SEQUENCE

CROSS-REFERENCE TO RELATED APPLICATION

This application claims the benefit of Provisional Application No. 61/172,402 filed on Apr. 24, 2009 in the United States Patent and Trademark Office, the contents of which are herein incorporated by reference in its entirety.

BACKGROUND

1. Technical Field

The present invention relates to the automatic measurement of morphometric and motion parameters.

2. Discussion of Related Art

Quantification of blood vessel morphology, e.g., measuring vessel diameter, branching angle, length, tortuosity, etc. has many applications in both diagnosis and therapy. The knowledge of theses parameters can help understanding the distribution of blood flow, diagnosis of diseases such as diabetes, hypertension, and arteriosclerosis, and can support decision making and planning of stent placement. In addition to morphometric parameters, the knowledge of the local motion pattern of the coronary tree can help the physician identify stenoses and is useful to support the diagnosis of pathologies, e.g., atherosclerosis.

Several approaches for the extraction of a 3D/4D model have been addressed in the literature, e.g., by Blondel et al. and Lioa et al. These models have been used for visualization purposes.

However, no known system or method exists for the automatic measurement of morphometric and motion parameters.

BRIEF SUMMARY

According to an embodiment of the present disclosure, a method for automatic measurement of morphometric and motion parameters of a coronary target includes receiving input data corresponding to the coronary target, extracting reference frames from the input data corresponding to different phases of a cardiac cycle, extracting a three-dimensional centerline model for each phase of the cardiac cycle based on the references frames and projection matrices of the coronary target, tracking a motion of the coronary target through the phases based on the three-dimensional centerline models, and determining a measurement of morphologic and motion parameters of the coronary target based on the motion.

According to an embodiment of the present disclosure, a system for automatic measurement of morphometric and motion parameters of a coronary target includes a memory device storing a plurality of instructions embodying the system and a processor for receiving input data corresponding to the coronary target and executing the plurality of instructions to perform a method. The method includes extracting reference frames from the input data corresponding to different phases of a cardiac cycle, extracting a three-dimensional centerline model for each phase of the cardiac cycle based on the references frames and projection matrices of the coronary target, tracking a motion of the coronary target through the phases based on the three-dimensional centerline models, and determining a measurement of morphologic and motion parameters of the coronary target based on the motion.

BRIEF DESCRIPTION OF THE DRAWINGS

Preferred embodiments of the present disclosure will be described below in more detail, with reference to the accompanying drawings.

DETAILED DESCRIPTION OF PREFERRED EMBODIMENTS

According to an embodiment of the present disclosure, a method and system are described for automatic measurement of morphometric and dynamic motion parameters of the coronary artery tree from a rotation X-ray angio sequence. Quantification of morphometric and motion parameters is done based on a set of projection images, where foreshortening effects substantially prevent direct measurement. Measurable morphometric parameters include branching angle, length, or tortuosity, whereas motion can be expressed in terms of relative displacement or velocity.

According to an embodiment of the present disclosure, morphologic and motion parameters of a target are determined based on a 4D model. The 4D model is reconstructed based on rotational C-arm X-ray images, such as those obtained using the Siemens AXIOM-Artis C-arm system featuring a digital flat panel detector.

An exemplary embodiment of the present disclosure is described in terms of a heart target and the treatment of coronary bifurcation lesions with drug-eluding stents. In the example, bifurcations are classified based on the angulation between branches—an angle <70 degrees indicates a Y-shaped lesion, >70 degrees a T-shaped lesion. This classification helps a physician to decide whether a stenting procedure is needed, and which type of stent to implant.

In particular, due to the foreshortening effect in X-ray projection, imaging a reliable measurement of the bifurcation angle is difficult from a single projection. Furthermore, since the heart motion induces a change of these angles over a cardiac cycle, an accurate measurement requires different projections of the same cardiac phase.

In addition to morphometric parameters, relevant time-dynamic information (motion parameters) may be extracted from the 4D coronary tree model. Measurable relevant motion parameters include, but are not limited to, displacement and velocity of various segments of the tree over the course of a cardiac cycle.

According to an exemplary embodiment of the present disclosure, morphometric and motion parameters are determined based on a 4D model of the coronary artery tree. The 4D model is reconstructed based on rotational C-arm X-ray images.

Figure 1:
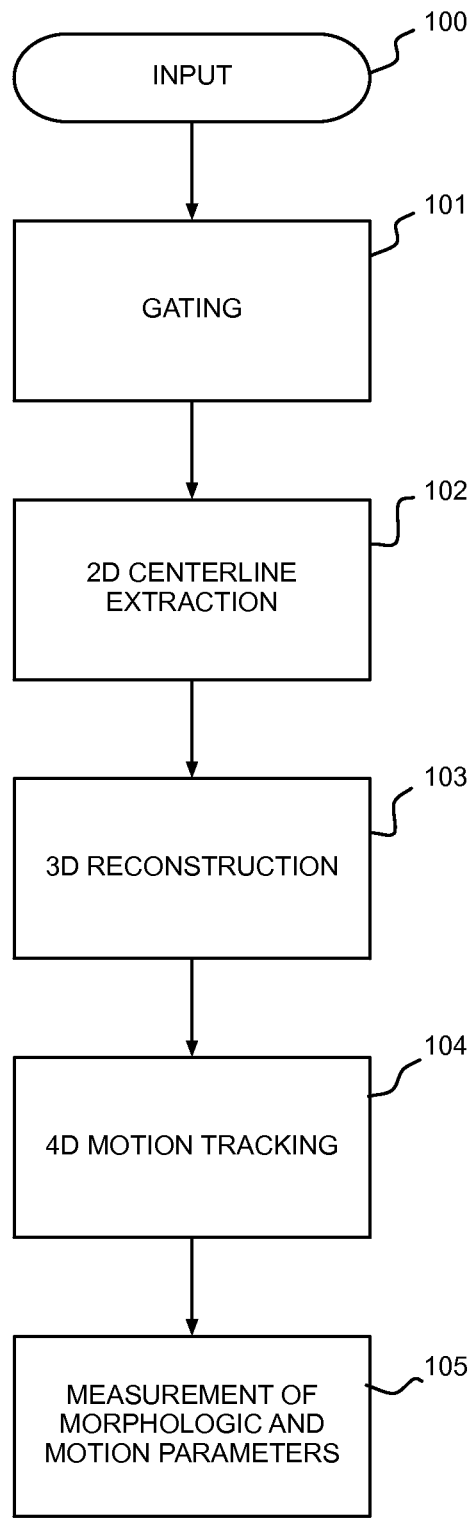
FIG. 1 is a flow diagram of a method according to an embodiment of the present disclosure.

The method depicted in FIG. 1 includes a imaging different phase of the target (101), 2D centerline extraction (102), 3D reconstruction (103), 4D motion tacking (104) and a measurement of morphometric and motion parameters (104). Given target input (100) about the phases of the target, the gating (101) extracts reference frames belonging to a specific phases. The 2D centerlines of the target are extracted from the reference frames (102). The 3D reconstruction uses the projection matrices of the calibrated C-arm to reconstruct a consistent 3D centerline model for the reference phase (103).

Using motion tracking, the temporal dynamics are computed using the projection images of all other phases (104). The relevant morphometric or motion information is extracted from the 4D model, given one or a number of landmarks to measure (105).

Figure 2:
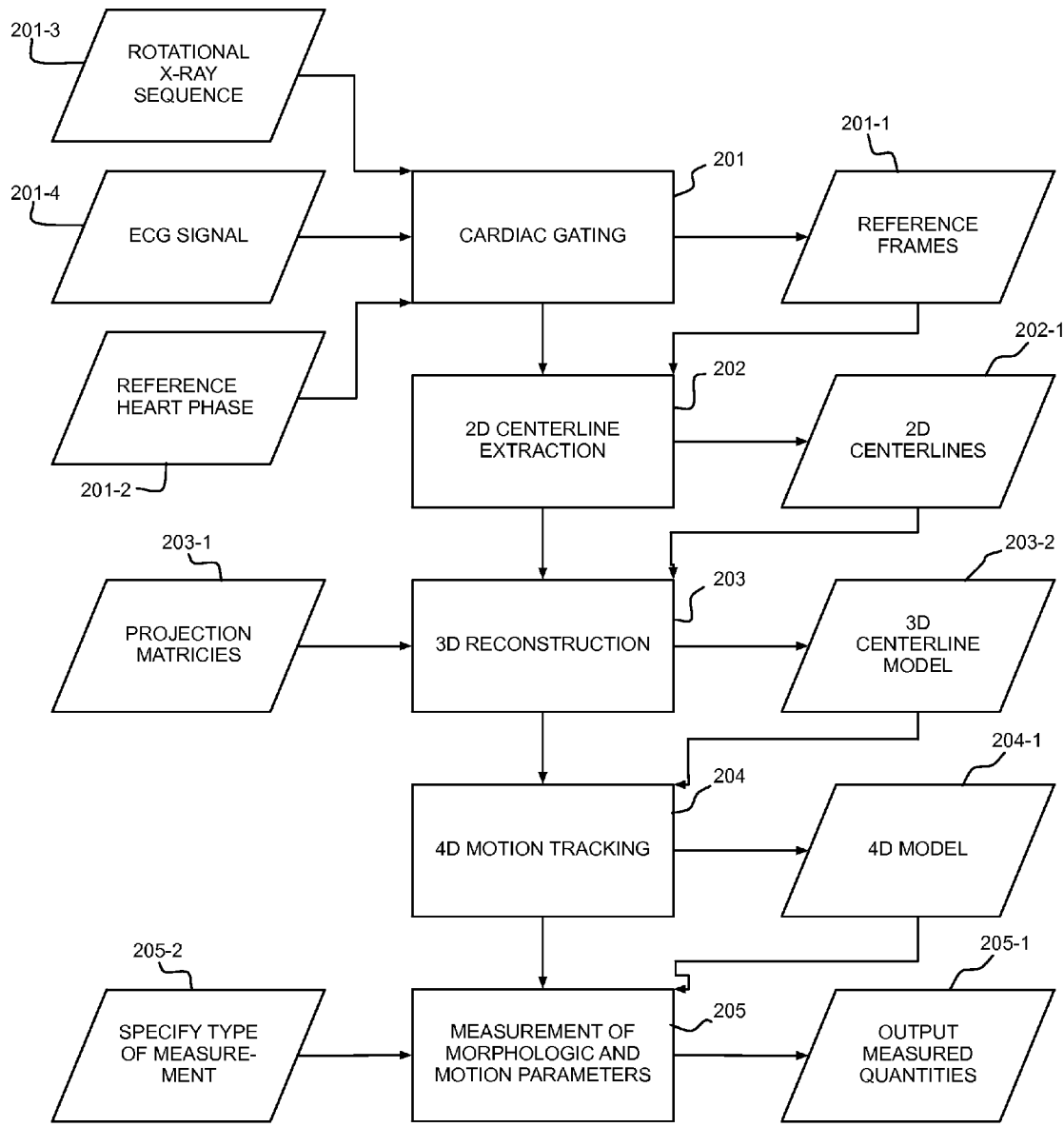
FIG. 2 is a flow diagram of a method according to an embodiment of the present disclosure.

Referring to FIG. 2 and the exemplary embodiment of the heart target, by using cardiac gating (201), reference frames (201-1) belonging to a specific reference heart phase (201-2) are extracted from the rotational X-ray sequence (201-3), based on an ECG (electrocardiogram) signal (201-4).

A 2D centerline extraction (202) extracts 2D centerlines (202-1) from the reference frames (201-1). Examples of 2D centerline extraction methods include a minimum cost path approach and topological thinning by a nonlinear diffusion technique, such as, Coherence Enhanced Diffusion (CED) (described in US Published Patent Application 2009/0141968).

A 3D reconstruction (203) uses projection matrices (203-1) of a calibrated C-arm to reconstruct a consistent 3D centerline model (203-2) for the reference heart phase. Numerous methods exist for 3D reconsideration. One exemplary method proposed by Blondel performs a 3D stereoscopic reconstruction of coronary arteries centerlines, including respiratory motion compensation, 4-D motion computation of coronary arteries, and a 3D tomographic reconstruction of coronary arteries, involving compensation for respiratory and cardiac motions. Another method proposed by Liao performs 3D reconstruction of coronary arteries taking images from multiple views and using an energy minimization problem (e.g., Graph Cuts) incorporating a soft epipolar line constraint and a smoothness term evaluated in 3D. Other methods of 3D reconstruction may be used in connection with embodiments of the present disclosure.

Using 4D motion tracking (204) (e.g., tracking the heart target in XYZ coordinates over time), the temporal dynamics are determined using the 3D centerline models (203-2) of two or more heart phases to produce a 4D model (204-1).

According to an embodiment of the present disclosure, the 4D motion tracking 204 begins from the reconstructed 3D model (203-2) for a static cardiac phase, coronary tree deformations are explicitly estimated from one cardiac phase to the next. Since deformations of the 3D coronary tree are tracked, this is a 4D reconstruction by deformation tracking.

According to an embodiment of the present disclosure, an external force is derived from gradient vector flow (GVF) determined from vessel enhancement filter responses ("vesselness"). GVF has superior capture range and convergence behavior over a regular gradient. GVF is also robust to noise perturbations, while 2D centerline extraction is sensitive to noise, rendering centerline-based methods unstable in noisy sequences.

According to an embodiment of the present disclosure, motion models (rigid and affine) involving about 90 to 180 parameters are used. The 4D reconstruction method is able to handle structural perturbations (due to missing branches) and heavy image noise perturbations more stably.

In the following description of the 4D motion tracking, a letter with a tilde means that it is in a homogeneous coordinate, $\tilde{X}_n^{(p)} = [X_n^{(p)T}, 1]^T$. A letter with a prime, e.g., u', X' represents deformation updated version of the same point (in 2D and 3D), u, X.

Problem Formulation. Given a sequence of F X-ray images, $I=\{I_f\}$ and their corresponding projection matrices $\{P_f\}$, f=1, 2, ..., F, taken by an X-ray C-arm. Recorded ECG signals allow us to map each frame f into one of P discrete cardiac phases, p=0, 1, ..., P−1. A 3D model of the coronary artery tree is reconstructed from a heart phase involving a low amount of motion. Without loss of generality, herein the optimal phase, denotes the base phase and denote it as phase 0. Note that the optimal cardiac phase is selected in conjunction with the reference selection phase step. The optimal phase for 3D reconstruction typically corresponds to the cardiac phase with the minimum cardiac motion and clear visibility of major branches. The model is in the form of a set of N 3D points, $\chi^{(0)} = \{X_n^{(0)}\}$, n=1, 2, ..., N. The problem is to infer a temporally deforming coronary artery tree, $\chi^{(p)}$ for all cardiac phases, from the images, such that projections of $\chi^{(p)}$ align with observations in all image frames corresponding to the cardiac phase.

Deformation Models. According to an embodiment of the present disclosure, deformation of a coronary tree is modeled by two 3D parametric deformation models, e.g., rigid and affine. The affine model can capture the majority of the beating motion associated with the cardiac cycle. Both transformations can be represented by a compact 4×4 matrix T(θ), where θ is the vector of motion parameters. Forward and inverse mappings between T and θ are assumed understood.

A 4D Coronary Tree Model. Then deformation from phase p−1 to p is $$\tilde{X}_n^{(p)} = T(\theta^{(p-1)}) \cdot \tilde{X}_n^{(p-n)} \qquad (1)$$

Note that all points in a 3D model $X^{(p-1)}$ are deformed to the next phase by the same T. By applying (1) recursively, the following may be determined $$\tilde{x}_n^{(p)} = \left( \prod_{i=p-1}^{0} T(\theta^{(i)}) \right) \cdot \tilde{x}_n^{(0)} \doteq \mathcal{T}^{(p)}(\theta) \cdot \tilde{X}_n^{(0)}, \qquad (2)$$

where $$\mathcal{T}^{(p)}(\theta) \doteq \prod_{i=p-1}^{0} T(\theta^{(i)})$$

is the accumulative deformation from frame 0 to p and $\theta = (\theta^{(0)T}, \ldots, \theta^{(P-1)T})^T \in R^{mP \times 1}$ is a concatenation of $\theta^{(p)}$, and m is the parameter length (6 for rigid and 12 for affine).

Deformation Update. According to an embodiment of the present disclosure, the method adopts an iterative deformation update approach. Initially, the 4D coronary tree is trivial, i.e., $\chi^{(p)} = \chi^{(0)}, \forall p$. Due to cardiac deformations, projections of this 4D coronary reconstruction will not align with the observed X-ray images except for the base phase. The iterative update approach then seeks to find updates to $T^{(p)}, \forall p$, such that the projections progressively march towards the image observations. In the following, a compositional update rule is used, although other motion update rules, such as additive update rules, can be used instead:

$$T(\theta^{(p)}) \leftarrow T(\delta\theta^{(p)}) \cdot T(\theta^{(p)}) \qquad (3)$$

Put all the update parameters in a vector $\delta\theta \doteq (\delta\theta^{(0)T}, \ldots, \delta\theta^{(P-1)T})^T \in R^{mP \times 1}$ and by slight abuse of notation, denote $$\mathcal{T}^{(p)}(\theta, \delta\theta) \doteq \prod_{i=p-1}^{0} (T(\delta\theta^{(i)}) \cdot T(\theta^{(i)})) \qquad (4)$$

as the updated accumulative deformation. An updated 2D projection ũ' (in homogeneous coordinate) is derived by $$\tilde{u}'_{nf}(\theta, \delta\theta) \doteq [x'_{nf}, y'_{nf}, z'_{nf}]^T \cong P_f^{(p)} \cdot \mathcal{T}^{(p)}(\theta, \delta\theta) \cdot \tilde{X}_n^{(0)}. \qquad (5)$$

where ≅ means equal up to a scale. Note that the phase-frame correspondence p↔f is known given the recorded ECG signal. Next, the updated 2D projection in inhomogeneous coordinate is $$u'_{nf} = \left[\frac{x'_{nf}}{z'_{nf}}, \frac{y'_{nf}}{z'_{nf}}\right]^T \approx u_{nf} + \begin{bmatrix} d_{1nf} \\ d_{2nf} \end{bmatrix} \cdot \delta\theta \quad (6)$$

where in the second (approximate) equality we used first order approximations and $d_{knf}$, k=1, 2 are data term related Jacobian for point n in frame f. Denote $$v_{nf} \doteq [v_{1nf} v_{2nf}]^T \doteq u'_{nf} - u_{nf} \quad (7)$$

as the desired vector flow in a 2D image. Thus for each point n and a frame f, two linear constraints are derived on the deformation update parameters, $$d_{knf}^T \cdot \delta\theta \approx v_{knf} \, k=1,2. \quad (8)$$

In this disclosure, the gradient vector flow (GVF) field was chosen to provide $v_{knf}$ Cyclic Deformation Constraints. Cardiac motions are cyclic, which implies that after a complete cycle, a point should end up at the same starting point, $$T^{(P)}(\theta, \delta\theta) \tilde{X}_n^{(0)} = \tilde{X}_n^{(0)}. \quad (9)$$

A first order approximation can be derive for each point $X_n^{(0)}$ $$c_{kn}^T \cdot \delta\theta \approx c_{kn}, k=1,2,3 \quad (10)$$

each for a coordinate X, Y, Z. The right hand side has an intuitive explanation of cyclic residues, i.e., cyclic motion residue due to currently estimated deformation model θ. The above constraints express the requirement to make up for these residues using the deformation update δθ.

Smooth Deformation Constraints. Cardiac motions are smooth and can be modeled by a Laplacian constraint, $$(T^{(p-1)}(\theta, \delta\theta) - 2 \cdot T^{(p)}(\theta, \delta\theta) + T^{(p+1)}(\theta, \delta\theta)) \cdot \tilde{X}_n^{(0)} = 0. \quad (11)$$

Again, a first order approximation can be derived, $$s_{kn}^{(p)T} \cdot \delta\theta \approx s_{kn}^{(p)}, k=1,2,3. \quad (12)$$

The above constraints also has an intuitive interpretation: The deformation update (left) should make up for any non-smooth deformation (right side) due to the currently estimated deformation θ.

The Cost Function. Finally, by combining (8), (10), and (12), a cost function for 4D coronary tree reconstruction can be written as $$C(\delta\theta) = \sum_{f,n,k} \left( \|d_{knf}^T \delta\theta - v_{knf}\| + \lambda_s \|s_{kn}^{(p)T} \delta\theta - s_{kn}^{(p)}\| + \lambda_c \|c_{kn}^T \delta\theta - c_{kn}\| \right) \quad (13)$$

where $\lambda_s$ and $\lambda_c$ are weights for smoothness and cyclic constraints respectively. The $L_2$ norm is used in this study. (13) can be solved efficiently using least-squares.

Morphometric and/or motion information (205-1) is extracted at block 205 from the 4D model (204-1), given a specified type of measurement or one or a number of landmarks to measure (205-2).

The quantitative knowledge of bifurcation angles, etc., can provide additional diagnostic benefit. These parameters (205-1) can be displayed in overlay with the model, either as a still image or as a movie, to present the information to a clinician in a meaningful way.

One example the parameters used in an exemplary implementation is the determination of the bifurcation angle between the left circumflex artery (LCX) and left anterior descending artery (LAD) extracted from a 4D model over two cardiac cycles. Another example an implementation is the determination of a displacement and velocity for specific landmarks, for example, displayed in a sequence of velocity maps.

The method we describe here is based on symbolic centerline tree models, e.g., the location and connectivity of each section of the vessel tree is known. This allows us to investigate morphometric parameters like length, branching angle, toruosity, and local velocity. However, the technique extends naturally to more complex models. For example, if the vessel diameter is extracted along with the centerline, additional parameters like branching proportions can be computed.

It is to be understood that embodiments of the present disclosure may be implemented in various forms of hardware, software, firmware, special purpose processors, or a combination thereof. In one embodiment, a method for low complexity signal analysis may be implemented in software as an application program tangibly embodied on a computer readable medium. The application program may be uploaded to, and executed by, a processor comprising any suitable architecture.

Figure 3:
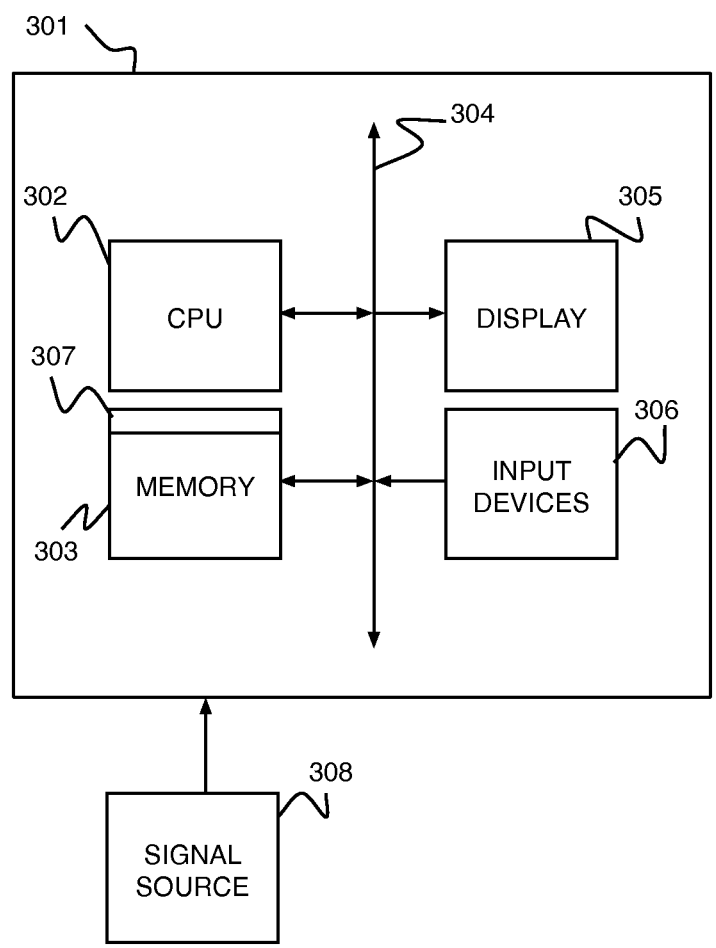
FIG. 3 is a diagram of a computer system for automatic measurement of morphometric and motion parameters according to an embodiment of the present disclosure.

Referring to FIG. 3, according to an embodiment of the present disclosure, a computer system 301 for implementing a method for automatic measurement of morphometric and motion parameters can comprise, inter alia, a central processing unit (CPU) 302, a memory 303 and an input/output (I/O) interface 304. The computer system 301 is generally coupled through the I/O interface 304 to a display 305 and various input devices 306 such as a mouse and keyboard. The support circuits can include circuits such as cache, power supplies, clock circuits, and a communications bus. The memory 303 is non-transitory and can include random access memory (RAM), read only memory (ROM), disk drive, tape drive, etc., or a combination thereof. Embodiments of the present disclosure can be implemented as a routine 307 that is stored in memory 303 and executed by the CPU 302 to process the signal from the signal source 308. As such, the computer system 301 is a general-purpose computer system that becomes a specific purpose computer system when executing the routine 307 of the present disclosure.

The computer platform 301 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the methods described herein are programmed. Given the teachings of the present disclosure provided herein, one of ordinary skill in the related art will be able to contemplate these and similar implementations or configurations of embodiments described herein.

Having described embodiments for automatic measurement of morphometric and motion parameters, it is noted that modifications and variations can be made by persons skilled in the art in light of the above teachings. It is therefore to be understood that changes may be made in embodiments of the present disclosure that are within the scope and spirit thereof.

What is claimed is:

1. A method for automatic measurement of morphometric and motion parameters of a coronary target comprising:
receiving input data corresponding to the coronary target;
extracting reference frames from the input data corresponding to different phases of a cardiac cycle;
extracting a three-dimensional centerline model for each phase of the cardiac cycle based on the references frames and projection matrices of the coronary target;
tracking a motion of the coronary target through the phases based on the three-dimensional centerline models; and
determining a measurement of morphologic and motion parameters of the coronary target based on the motion,
wherein the method is embodied in machine readable code executed by a processor,
wherein tracking of the motion of the coronary target further comprises:
computing a gradient vector flow (GVF) using intermediate images computed from a vesselness filter;
formulating a cost function that ensures fidelity to image observations and smooth and cyclic motion priors; and
updating, iteratively, tracking parameters and/or deformation models using a first order approximation to a cost function, utilizing a set of linear approximations to a nonlinear cost function.

2. The method of claim 1, wherein extracting the three-dimensional centerline model further comprises:
extracting a two-dimensional centerline from each of the reference frames; and
extracting the three-dimensional centerline model for each phase of the cardiac cycle from the two-dimensional centerlines and the projection matrices.

3. The method of claim 1, wherein the input data comprises a rotational sequence of images of the coronary target, an electrocardiogram corresponding to the rotational sequence, and an indication of the reference phase of the coronary target, the method comprising performing a cardiac gating to extract the reference frames.

4. The method of claim 1, further comprising overlaying the morphologic and motion parameters on a display of the coronary target.

5. The method of claim 1, wherein the morphometric parameter includes at least one of branching angle, length, and tortuosity, and wherein the motion parameter includes at least one of relative displacement and velocity over two or more cardiac cycles.

6. The method of claim 1, wherein the morphologic and motion parameters comprise velocity, the method further comprising displaying the velocity of the coronary target at two or more phases.

7. A non-transitory computer readable medium embodying instructions executable by a processor to perform a method for automatic measurement of morphometric and motion parameters of a coronary target, the method comprising:
receiving input data corresponding to the coronary target;
extracting reference frames from the input data corresponding to different phases of a cardiac cycle;
extracting a three-dimensional centerline model for each phase of the cardiac cycle based on the references frames and projection matrices of the coronary target;
tracking a motion of the coronary target through the phases based on the three-dimensional centerline models; and
determining a measurement of morphologic and motion parameters of the coronary target based on the motion,
wherein tracking of the motion of the coronary target further comprises:
computing a gradient vector flow (GVF) using intermediate images computed from a vesselness filter;
formulating a cost function that ensures fidelity to image observations and smooth and cyclic motion priors; and
updating, iteratively, tracking parameters and/or deformation models using a first order approximation to a cost function, utilizing a set of linear approximations to a nonlinear cost function.

8. The computer readable medium of claim 7, wherein extracting the three-dimensional centerline model further comprises:
extracting a two-dimensional centerline from each of the reference frames; and
extracting the three-dimensional centerline model for each phase of the cardiac cycle from the two-dimensional centerlines and the projection matrices.

9. The computer readable medium of claim 7, wherein the input data comprises a rotational sequence of images of the coronary target, an electrocardiogram corresponding to the rotational sequence, and an indication of the reference phase of the coronary target, the method comprising performing a cardiac gating to extract the reference frames.

10. The computer readable medium of claim 7, further comprising overlaying the morphologic and motion parameters on a display of the coronary target.

11. The computer readable medium of claim 7, wherein the morphometric parameter includes at least one of branching angle, length, and tortuosity, and wherein the motion parameter includes at least one of relative displacement and velocity over two or more cardiac cycles.

12. The computer readable medium of claim 7, wherein the morphologic and motion parameters comprise velocity, the method further comprising displaying the velocity of the coronary target at two or more phases.

13. A system for automatic measurement of morphometric and motion parameters of a coronary target comprising:
a memory device storing a plurality of instructions;
a processor for receiving input data corresponding to the coronary target and executing the plurality of instructions to perform a method comprising:
extracting reference frames from the input data corresponding to different phases of a cardiac cycle;
extracting a three-dimensional centerline model for each phase of the cardiac cycle based on the references frames and projection matrices of the coronary target;
tracking a motion of the coronary target through the phases based on the three-dimensional centerline models; and
determining a measurement of morphologic and motion parameters of the coronary target based on the motion,
wherein tracking of the motion of the coronary target further comprises:
computing a gradient vector flow (GVF) using intermediate images computed from a vesselness filter;
formulating a cost function that ensures fidelity to image observations and smooth and cyclic motion priors; and
updating, iteratively, tracking parameters and/or deformation models using a first order approximation to a cost function, utilizing a set of linear approximations to a nonlinear cost function.

14. The system of claim 13, wherein extracting the three-dimensional centerline model further comprises:
extracting a two-dimensional centerline from each of the reference frames; and extracting the three-dimensional centerline model for each phase of the cardiac cycle from the two-dimensional centerlines and the projection matrices.

15. The system of claim 13, wherein the input data comprises a rotational sequence of images of the coronary target, an electrocardiogram corresponding to the rotational sequence, and an indication of the reference phase of the coronary target, the method comprising performing a cardiac gating to extract the reference frames.

16. The system of claim 13, further comprising a display for visualizing the measurement of morphologic and motion parameters of the coronary target.

* * * * *